United States Patent [19]

Mischutin

[11] 4,113,902

[45] * Sep. 12, 1978

[54] FLAME RETARDANTS FOR NATURAL AND SYNTHETIC MATERIALS

[75] Inventor: Vladimir Mischutin, Union City, N.J.

[73] Assignee: White Chemical Corporation, Bayonne, N.J.

[*] Notice: The portion of the term of this patent subsequent to Apr. 15, 1992, has been disclaimed.

[21] Appl. No.: 751,661

[22] Filed: Dec. 17, 1976

Related U.S. Application Data

[63] Continuation of Ser. No. 579,824, May 22, 1975, abandoned, which is a continuation of Ser. No. 483,950, Jun. 28, 1974, abandoned, which is a continuation-in-part of Ser. No. 300,731, Oct. 25, 1972, Pat. No. 3,877,974, and Ser. No. 415,667, Nov. 14, 1973, Pat. No. 3,955,032.

[51] Int. Cl.² .......................... B05D 1/34; C09K 3/28; D06M 15/32

[52] U.S. Cl. ................................ 427/390 D; 427/392; 428/921

[58] Field of Search .......................... 427/390 D, 392; 428/921; 252/8.1

[56] References Cited

U.S. PATENT DOCUMENTS

| 3,324,205 | 6/1967 | Carpenter et al. | 252/8.1 X |
| 3,877,974 | 4/1975 | Mischutin | 428/921 X |

*Primary Examiner*—James R. Hoffman
*Attorney, Agent, or Firm*—Eugene E. Geoffrey, Jr.

[57] ABSTRACT

A process for rendering natural materials, synthetic materials and blend of same, flame retardant which entails treating said materials with an aqueous dispersion of a brominated aliphatic compound, said brominated compound being a solid at room temperature, substantially insoluble in water and having been reduced to a fine particle size, together in the same bath with an emulsion of a suitable adhesive polymeric binder, followed by drying and baking.

12 Claims, No Drawings

FLAME RETARDANTS FOR NATURAL AND SYNTHETIC MATERIALS

RELATED INVENTIONS

This application is a continuation of my copending application Ser. No. 579,824 filed May 22, 1975 (now abandoned), which in turn is a continuation of my application Ser. No. 483,950 filed June 28, 1974 (now abandoned), which in turn is a continuation-in-part of my applications Ser. No. 300,731 filed Oct. 25, 1972, now U.S. Pat. No. 3,877,974, granted Apr. 15, 1975, and Ser. No. 415,667 filed Nov. 14, 1973, now U.S. Pat. No. 3,955,032, granted May 4, 1976, which applications are to be considered fully incorporated herein, all assigned to the assignee of the instant application.

BACKGROUND OF THE INVENTION

Articles of clothing apparel have been found to be one of the major causes of severe accidental burn injuries and fatalities. In addition, statistics have shown that children up to the age of fourteen years, are most susceptible to sustain burn injuries from articles of clothing apparel. In view of this, the legislatures of the states of California, Massachusetts, and Washington have outlawed the sale of flammable children's sleepwear. Many other state legislatures are also considering restrictive legislation dealing with flammable clothing.

The Federal Government, through the Department of Commerce, at first banned the sale of flammable large and small area carpets and rugs (DOC FFI - 7 and DOC FF2- 70), flammable children's sleepwear, sizes 0 to 6X (DOC FF3 - 71) and flammable mattresses (DOC FF4 - 72), and the Consumer Product Safety Commission later did the same with children's sleepwear, sizes 7 to 14 (FF5-74).

In view of these flammability laws, technology is needed to produce fabrics that meet the standards set forth in the above mentioned laws. A particular challenge to the textile and related industries was the production of flame retardant fabrics composed of blended fabrics, especially those composed of polyester/cotton fibers. This and the previously mentioned related inventions are primarily intended to fill the growing need for a flame retardant for blended fabrics.

DETAILED DESCRIPTION OF THE INVENTION

In my copending U.S. application Ser. No. 300,731, filed Oct. 25, 1972, now U.S. Pat. No. 3,877,974, I describe the use of a large family of brominated aromatic compounds and the metallic oxide as the flame retardant.

In my U.S. application Ser. No. 415,667, filed Nov. 14, 1973, now U.S. Pat. No. 3,955,032 I extend the concept to the use of chlorinated and chlorobrominated compounds.

The essential requirement of these materials is that they have a high halogen content, be solids at room temperature, and extremely insoluble in water. The technique of application involves reducing the compound to an extremely fine state of subdivision, to a micron or submicron particle size, i.e., less than five microns, preferably less than 2 microns, and suspending the finely divided material in water, to form a stable dispersion. This dispersion is now applied to fabrics together with an emulsion of an adhesive polymeric binder, commonly known as latex, by dipping them in a solution of the same and removing the excess by squeezing between two rollers, followed by drying and baking to cure the resin.

In this respect, reference may be had to my copending applications which should be deemed as being fully incorporated herein.

The nature of the compounds useful for the purpose of this invention may be summarized as follows:

In my copending applications I have described and classified a large variety of brominated, chlorinated, and chlorobrominated aromatic and cycloaliphatic compounds useful for the purposes of the invention.

I have found that a family of brominated aliphatic compounds, having substantially the same physical characteristics as the cyclic materials in that they are solids at room temperature and extremely insoluble in water.

This family of compounds may be described as follows:

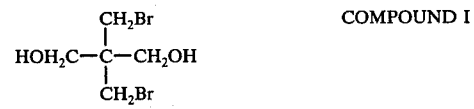

2,2-(bromomethyl) 1,3-propanediol
(dibromo neopentyl glycol).

COMPOUND I

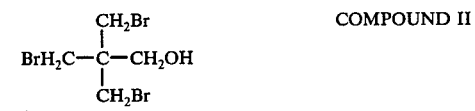

2,2-bis(bromomethyl) 3-bromo 1-propanol
(tribromoneopentyl alcohol).

COMPOUND II

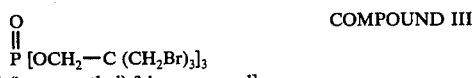

Tris [2,2-bis(bromomethyl) 3-bromopropyl] phosphate
Tris (tribromoneopentyl) phosphate.

COMPOUND III

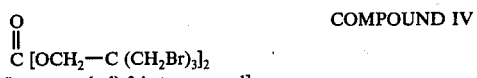

Bis [2,2-bis(bromomethyl) 3-bromopropyl] carbonate
Bis (tribromoneopentyl) carbonate.

COMPOUND IV

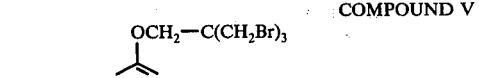

Tris [2,4,6-(2,2-bis(bromomethyl) 3-bromopropyloxy] 1,3,5-triazine

COMPOUND V

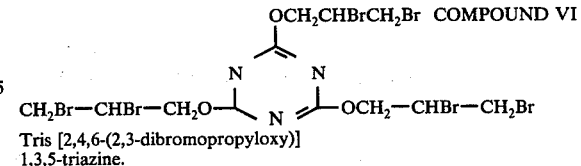

Tris [2,4,6-(2,3-dibromopropyloxy)] 1,3,5-triazine.

COMPOUND VI

COMPOUND VII

A polymer obtained by reacting Compound I with phosphorus trichloride ($POCl_3$) in the presence of an acid acceptor.

COMPOUND VIII

A polymer obtained by reacting Compound I with phosgene

in the presence of an acid acceptor.

COMPOUND IX

A polymer obtained by reacting Compound I with cyanuric chloride in the presence of an acid acceptor.

The advantage of these compounds over those given in my copending applications is that since they are aliphatic in nature, they do not require a metallic oxide synergist.

In the following examples, all parts are by weight.

EXAMPLE I

Seventy parts of Compound III having an average particle size of one micron and all particles being smaller than 2 microns in diameter were dispersed in 30.0 parts of water containing 0.3 part of a hydroxyethyl cellulose thickener, 2.0 parts of a wetting agent, and 0.5 part of a dispersing agent. The dispersion thus obtained was agitated for an additional hour. This dispersion was designated "Dispersion I."

Fifty parts of Dispersion I were diluted with 32 parts of water containing 0.5 part of an ethoxylated nonyl phenol wetting agent and to this solution eighteen parts of a 50% emulsion of a copolymer of butyl acrylate, two ethyl hexyl acrylate, methacrylic acid, aryloamide and itaconic acid. This solution was labeled "Solution I."

Pieces of fabric composed of 100% cotton, 35% polyester-65% cotton, 50% polyester-50% cotton, and 65% polyester-35% cotton were immersed in Solution I and the excess removed by squeezing between two rollers, adjusting the pressure of the rollers to obtain a 100% wet pick-up. All fabrics were dried at 120° C and baked at 160° C for 3 minutes.

The fabrics thus treated were scoured with an 0.5% aqueous solution of sodium carbonate at 80° C for 5 minutes, rinsed and dried.

The flame retardant properties were evaluated using the test method given in flammability standard for children's sleepwear DOC FF3-71 initially and after fifty home launderings giving an average char length of less than seven inches (17.8 cm.) in all cases, with no individual giving a char length of 10 inches (25.4 cm.)

EXAMPLE II

Seventy parts of Compound VI having an average particle size of one micron were dispersed in thirty parts of water containing thickener, wetting and dispersing agent in the same manner as in Example I. This dispersion was designated "Dispersion II."

Fifty parts of Dispersion II were dissolved in 32 parts of water containing 0.5 part of ethoxylated nonyl phenol wetting agent. To this solution was added eighteen parts of a 50% aqueous emulsion of a carboxylated styrene-butadiene copolymer. This solution was designated "Solution II."

Pieces of fabrics identical to those used in Example I were immersed in Solution II and the excess was removed by squeezing between two rollers adjusting the pressure of the rolls so as to give 100% wet pick-up on all fabrics. Fabrics were now dried, baked and after-scoured similarly to what was done in Example I.

The fabrics thus treated passed the specifications set forth in the standard for the flammability of children's sleepwear DOC FF3-71.

EXAMPLE III

The procedure outlined in Example I was repeated using Compound V with similar results.

EXAMPLE IV

Procedure set forth in Example I was repeated using Compound VI with similar results.

EXAMPLE V

Procedure of Example I was repeated using Compound VII with similar results.

What is claimed is:

1. A method of rendering textile materials flame retardant, which comprises
    wetting said materials with an aqueous dispersion of a brominated aliphatic compound selected from the group consisting of

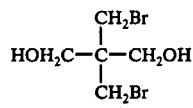

2,2-(bromomethyl) 1,3-propanediol (dibromoneopentyl glycol);

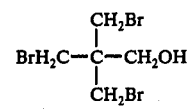

2,2-bis (bromomethyl) 3-bromo 1-propanol (tribromoneopentyl alcohol);

Tris [2,2-bis(bromonethyl) 3-bromopropyl] phosphate
Tris (tribromoneopentyl) phosphate;

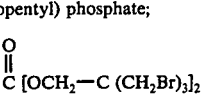

Bis [2,2-bis(bromomethyl) 3-bromopropyl]carbonate
Bis (tribromoneopentyl) carbonate;

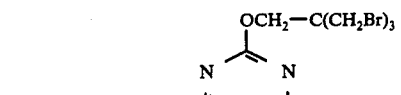

Tris [2,4,6-(2,2-bis(bromomethyl) 3-bromopropyloxy] 1,3,5-triazine;

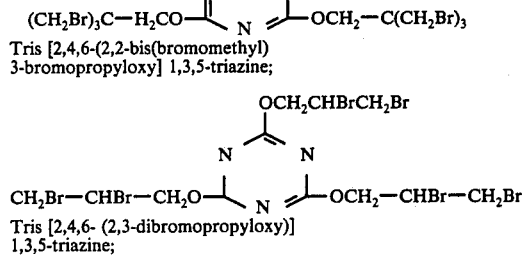

Tris [2,4,6- (2,3-dibromopropyloxy)] 1,3,5-triazine;

VII. A polymer obtained by reacting Compound I with phosphorus trichloride (POCl₃) in the presence of an acid acceptor;

VIII. A polymer obtained by reacting Compound I with phosgene

in the presence of an acid acceptor; and

IX. A polymer obtained by reacting Compound I with cyanuric chloride in the presence of an acid acceptor;
said brominated aliphatic compound being solid at room temperature,
substantially insoluble in water and having an average particle size of two microns or less in diameter,
together in the same bath with a suitable adhesive polymeric binder, and drying.

2. The method in accordance with claim 1 wherein in addition to the material which is flame retarded the adhesive polymeric binder itself is flame retarded.

3. A method in accordance with claim 1 wherein the polymeric adhesive binder is an emulsion of a homo or copolymer of any one of the following monomers or pair thereof:
Acrylic Acid
Methacrylic Acid
Acrylonitrile
Acrylamide
N-Methylolacrylamide
Esters of Acrylic and Methacrylic Acids
Vinyl Chloride
Vinylidene Chloride
Vinyl Bromide
Vinyl Esters
Styrene
Butadiene 4. A method as claimed in claim 1, wherein said brominated aliphatic compound is 2,2-(bromomethyl) 1,3-propanediol of the formula:

$$\text{HOH}_2\text{C} - \underset{\underset{\text{CH}_2\text{Br}}{|}}{\overset{\overset{\text{CH}_2\text{Br}}{|}}{\text{C}}} - \text{CH}_2\text{OH}$$

5. A method as claimed in claim 1, wherein said brominated aliphatic compound is 2,2-bis (bromomethyl) 3-bromo 1-propanol of the formula:

$$\text{BrH}_2\text{C} - \underset{\underset{\text{CH}_2\text{Br}}{|}}{\overset{\overset{\text{CH}_2\text{Br}}{|}}{\text{C}}} - \text{CH}_2\text{OH}$$

6. A method as claimed in claim 1, wherein said brominated aliphatic compound is tris (tribromo neopentyl) phosphate of the formula:

$$\overset{\overset{\text{O}}{\|}}{\text{P}} [\text{OCH}_2\text{—C (CH}_2\text{Br)}_3]_3$$

7. A method as claimed in claim 1, wherein said brominated aliphatic compound is bis (tribromo neopentyl) carbonate of the formula:

$$\overset{\overset{\text{O}}{\|}}{\text{C}} [\text{OCH}_2\text{—C (CH}_2\text{Br)}_3]_2$$

8. A method as claimed in claim 1, wherein said brominated aliphatic compound is tris [2,4,6-(2,2-bis(-bromomethyl) 3-bromopropyloxy)] 1,3,5-triazine of the formula:

[structure: 1,3,5-triazine with three OCH$_2$—C(CH$_2$Br)$_3$ substituents]

9. A method as claimed in claim 1, wherein said brominated aliphatic compound is tris [2,4,6-(2,3-dibromopropyloxy)] 1,3,5-triazine of the formula:

[structure: 1,3,5-triazine with three OCH$_2$CHBrCH$_2$Br substituents]

10. A method as claimed in claim 1, wherein said brominated aliphatic compound is a polymer obtained by reaction of 2,2-(bromometyl) 1,3-propanediol of the formula:

$$\text{HOH}_2\text{C} - \underset{\underset{\text{CH}_2\text{Br}}{|}}{\overset{\overset{\text{CH}_2\text{Br}}{|}}{\text{C}}} - \text{CH}_2\text{OH}$$

with phosphorus trichloride in the presence of an acid acceptor.

11. A method as claimed in claim 1, wherein said brominated aliphatic compound is a polymer obtained by reaction of 2,2-(bromomethyl) 1,3-propanediol of the formula:

$$\text{HOH}_2\text{C} - \underset{\underset{\text{CH}_2\text{Br}}{|}}{\overset{\overset{\text{CH}_2\text{Br}}{|}}{\text{C}}} - \text{CH}_2\text{OH}$$

with phosgene in the presence of an acid acceptor.

12. A method as claimed in claim 1, wherein said brominated aliphatic compound is a polymer obtained by reaction of 2,2-(bromomethyl) 1,3-propanediol of the formula:

$$\text{HOH}_2\text{C} - \underset{\underset{\text{CH}_2\text{Br}}{|}}{\overset{\overset{\text{CH}_2\text{Br}}{|}}{\text{C}}} - \text{CH}_2\text{OH}$$

with cyanuric chloride in the presence of an acid acceptor.

* * * * *

UNITED STATES PATENT OFFICE
CERTIFICATE OF CORRECTION

Patent No. 4,113,902                    Dated September 12, 1978

Inventor(s) Vladimir Mischutin

It is certified that error appears in the above-identified patent and that said Letters Patent are hereby corrected as shown below:

<u>Column 2, lines 52-56</u>, change the structural formula to recite as follows:

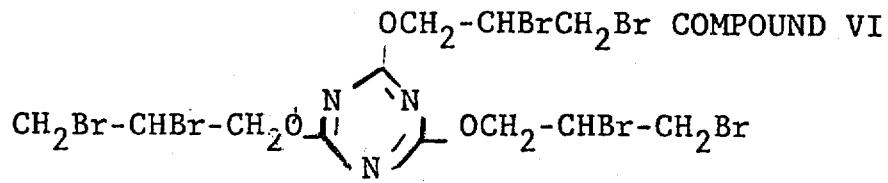

<u>Column 4, lines 51-55</u>, change the structural formula to recite as follows:

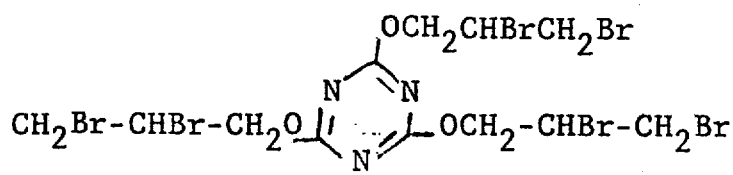

UNITED STATES PATENT OFFICE
CERTIFICATE OF CORRECTION

Patent No. 4,113,902         Dated September 12, 1978

Inventor(s) Vladimir Mischutin

It is certified that error appears in the above-identified patent and that said Letters Patent are hereby corrected as shown below:

Claim 9, lines 21-25, change the structural formula to recite as follows:

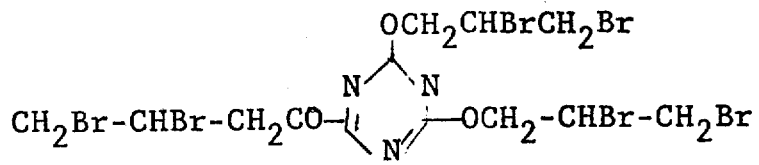

Signed and Sealed this

Fourth Day of September 1979

[SEAL]

Attest:

LUTRELLE F. PARKER
Attesting Officer    Acting Commissioner of Patents and Trademarks